Patented Feb. 24, 1931

1,794,298

UNITED STATES PATENT OFFICE

ALEXANDER JUST, OF BUDAPEST, HUNGARY, ASSIGNOR TO GENERAL ELECTRIC COMPANY, A CORPORATION OF NEW YORK

THERMIONIC CATHODE

No Drawing. Application filed May 2, 1927, Serial No. 188,412, and in Austria September 21, 1926.

The present invention relates to cathodes for electron tubes such as used as sender and receiving tubes for wireless telegraphy, telephony and similar purposes.

Most of the cathodes hitherto used consist of tungsten metal or tungsten to which is added a small quantity of thorium, or of a platinum alloy, which is intermingled or coated with the oxides of the earth metals. These so-called oxide cathodes have an essentially greater emitting capacity for electrons, than for example the cathodes which consist of tungsten unassociated with oxides.

The present invention relates to oxidic cathodes in which there is used a mixture of oxides in materially unlike, hereafter more fully described, proportion.

My invention comprises a thermionic cathode capable of a specially high electron emission and containing an oxide mixture, in which there is present an oxide in a large excess as compared with an oxide belonging to a different chemical group.

This phenomenon agrees with the fact that chemically pure oxides show under the influence of cathodes either no rays at all, or only a luminescence in a small degree, but that by the addition of an exceedingly small quantity of another oxide there occurs at once a strong luminescence, which as is known can be ascribed to electron processes.

For the purposes of the present invention there is especially useful a mixture of oxides comprising an oxide of the alkaline earth group of metals, such as calcium, strontium, barium, with a very small addition of one of the oxides of the rare earth group of metals, especially thorium oxide, praseodymium oxide, samarium oxide, whereby the alkaline earth oxide is present in at least the thousandfold excess. The rare constituent is believed to facilitate the production of the pure alkaline earth metal from the oxide. During operation the electronically-active material which is constituted of alkaline earth in pure metal state, is being continually destroyed or consumed and the admixed rare earth oxide serves to produce an additional quantity of the active metal from the oxide in order to restore equilibrium. It is apparent that for the highest efficiency, the alkaline earth metal should be formed at the same rate as is being consumed and since this rate is comparatively slow the agent which facilitates the production of the active metal from the oxide must be correspondingly small. The amount to which the rare earth oxide should be present for optimum results is determined to be approximately .1% of the amount of alkaline earth oxide or similar ingredient.

My invention also includes a cathode containing an oxide of the alkaline earth group of metals admixed with a very small quantity of oxides not included in the rare earth group, for example chromium oxide or uranium oxide.

In all these cases the alkaline earth oxide can be considered as the solvent, the other oxide added in very small quantity as the dissolved stuff and thus the oxide mixture can be considered as a solid solution.

As a solvent there can also be advantageously used an oxide of the rare earth metals, especially lanthanum oxide with a very small addition of another rare earth oxide, especially thorium oxide, neodymium oxide, praseodymium oxide, samarium oxide, whereby the oxide present in excess should be present in at least a thousandfold excess.

There can also be used the mixtures of oxides of the alkaline earth metals with one another, for example barium oxide in excess with an admixture of a very small quantity of calcium oxide.

The manufacture of oxide cathodes can be carried out according to different methods.

Either a metal wire is coated in the known manner with the oxides or a wire is made, which consists of a homogeneous mixture of the conductor metal with the oxide mixture.

For example there is mixed a difficultly fusible metal, especially molybdenum, in a finely divided, powder-like state with a small quantity, up to about 3%, of an oxide mixture, in which there exists one oxide which constitutes by weight no more than about onetenth of one per cent of the other oxide and is then worked at a high temperature in the known manner, eventually after a previous sintering, by mechanical working, such as pressing, rolling, hammering, into a coherent body and is then drawn into a wire.

In this there is advantageously used an oxide mixture in which an oxide of the alkaline earth metals, calcium, strontium, barium, is present in at least a thousandfold excess as compared with a small quantity of one of the oxides of the rare earth metals, especially thorium oxide, neodymium oxide, praseodymium oxide, samarium oxide.

Such oxide mixtures can also be composed of the oxides of the alkaline earth metals for example of a large excess of barium oxide with a very small addition of calcium oxide.

There can likewise be added to the alkaline earth oxide a very small quantity of chromium oxide or uranium oxide.

Good results are obtained with an oxide mixture in which there is present an oxide of the rare earth metals, especially lanthanum oxide, in a thousandfold excess at least as compared with a small quantity of another oxide, especially thorium oxide, neodymium oxide, praseodymium oxide or samarium oxide.

Instead of adding to the finely divided powderlike conductor metal the mixture of the above said oxides, a mixture of the metals can be added to the respective oxides.

In this case the wire after completion is further subjected to a glow process in a damp hydrogen atmosphere, whereby the oxidation of the added metals proceeds under the formation of oxide, without the conductor metal being affected by the oxidation. It is necessary, however, in this process to use a large excess of hydrogen as compared to the water vapor.

It is also possible to alloy the conductor metal, for example molybdenum or nickel, in a molten condition with a small quantity, up to 3%, of the respective metal mixture, in which the one metal as compared with the other is present in at least the thousandfold excess, and then after harden to work it up in the ordinary manner into wire. In this also the oxidation of the additional metals must be produced in a humid hydrogen atmosphere.

Finally it is also possible in the known manner, to coat the conductor metal, molybdenum, nickel, platinum or another metal, or a metal alloy, the point of fusion of which lies above 1000° C. with the oxide material.

The processes of producing oxide coatings on such metals are mostly known. The oxide is either applied to the metal wire mechanically and then an adherence of the oxide layer is produced by glowing or else the metals of the respective oxides are carried onto the surface of the conductor metal and an alloy of the conductor metal with the coating metal is produced by glowing, whereupon by an oxidation process the metal to be coated is oxidized.

In the line of the present invention the conductor metal is coated with the oxide mixture, in which one oxide is present as compared with the other oxide, in a large, at least the thousandfold, excess.

As regards the oxide mixture, there is especially suitable, as already stated above, a combination of an oxide of the alkaline earth metals, calcium, strontium, barium, with a very small addition of one of the oxides of the rare earth metals, especially thorium oxide, neodymium oxide, praseodymium oxide, samarium oxide, whereby the alkaline earth oxide should be present in at least a thousandfold excess.

There can also be used a mixture of the alkaline earth oxides among one another, whereby the one oxide as compared with the other should be present in at least the thousandfold excess.

Then, too, there can be used as mentioned in the beginning, mixtures of alkaline earth oxides with chromium oxide or uranium oxide.

Finally, there can also be used mixtures of the oxides of the rare earth metals, especially lanthanum oxide with a very small addition of another oxide, especially neodymium oxide, praseodymium oxide, samarium oxide or thorium oxide, in which the oxide present in excess is so to at least the thousandfold, for the coating of the conductor metal.

As already mentioned the conductor metal can be alloyed on the surface with the metals, the oxides of which are to be used as coating and then to produce the oxidation by glowing in air or oxygen. In case, however, there is used as conductor metal a base metal, such as molybdenum, nickel, etc., then the oxidation process must be carried out by glowing in a humid hydrogen, whereby the hydrogen must be in large excess as compared with the water vapor, so that on the one hand the conductor metal is obtained in a metallic state, and that on the other hand, the coating metals are converted into oxides.

In accordance with the invention there are used as coating metals, metal mixtures or metal alloys in which one metal as compared with another metal is present at least in a thousandfold excess. Such metal mixtures, or metal alloys are best produced from some of the combinations mentioned in the beginning.

In order to produce a metallic coating it is also possible as already known, to start from the salts of the respective metals. The conductor metal is in this case coated with the salts, which upon the subsequent glowing disintegrate and leave behind the respective metals.

In this case there is used in accordance with the invention, a mixture of the acids of the metals mentioned in the beginning, in which the one salt is present as compared with the other salt in at least a thousandfold excess.

What I claim as new and desire to secure by Letters Patent of the United States, is:

1. A thermionic cathode consisting of a metal having a fusing point above 1000° C. and an electron emissive material comprising a mixture of oxides, said mixture being constituted in part of alkaline earth oxide and in part by rare earth metal oxide, one of said oxides by weight, amounting to about one-tenth of one per cent of the other oxide.

2. A thermionic cathode consisting of a metal having a fusing point above about 1000° C. and an electron emissive material comprising a mixture of alkaline earth oxide and rare earth oxide, the latter oxide amounting to not substantially more than one-tenth of one per cent of the other oxide.

In witness whereof, I have hereunto set my hand this nineteenth day of April, 1927.

ALEXANDER JUST.